(12) United States Patent
Iizuka

(10) Patent No.: US 6,816,292 B2
(45) Date of Patent: Nov. 9, 2004

(54) SCANNING OPTICAL SYSTEM

(75) Inventor: Takashi Iizuka, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/743,763

(22) Filed: Dec. 24, 2003

(65) Prior Publication Data

US 2004/0136043 A1 Jul. 15, 2004

(30) Foreign Application Priority Data

Dec. 26, 2002 (JP) ....................................... 2002-376162

(51) Int. Cl.⁷ ............................................. G02B 26/08
(52) U.S. Cl. ..................................... 359/204; 359/210
(58) Field of Search ................................ 359/204–205, 359/210, 216–219, 813, 819, 822, 823; 347/241–244

(56) References Cited

U.S. PATENT DOCUMENTS 4,390,235 A  6/1983 Minoura
5,054,866 A * 10/1991 Tomita et al. .............. 359/201
5,541,760 A  7/1996 Iizuka

FOREIGN PATENT DOCUMENTS

JP          57-54914       4/1982

* cited by examiner

Primary Examiner—James Phan
(74) Attorney, Agent, or Firm—Greenblum & Bernstein, P.L.C.

(57) ABSTRACT

Laser beams emitted from a plurality of light emitting points of a light source unit are converged by a first optical system to be focused in an auxiliary scanning direction in the vicinity of a reflecting surface of a polygon mirror, dynamically deflected by the polygon mirror, and converged by a second optical system to form scan lines on a scan target surface. The first optical system includes a plurality of cylindrical lenses, in which a second cylindrical lens is attached to a holder so as to be movable in the optical axis direction and is selectively stopped at two positions that satisfy a particular relationship. By the composition, the interval between the scan lines on the scan target surface measured in the auxiliary scanning direction can be switched correctly and with extreme ease in the multibeam optical system, without the need of using a movement control mechanism composed of high precision parts.

7 Claims, 10 Drawing Sheets fθ ERROR　　　　CURVATURE OF FIELD

SCANNING OPTICAL SYSTEM

BACKGROUND OF THE INVENTION

The present invention relates to a scanning optical system which converges a plurality of beams (emitted from a plurality of light emitting points) by a line image formation lens to focus in an auxiliary scanning direction in the vicinity of a reflecting surface of a deflecting system, dynamically deflects the beams by the deflecting system in a main scanning direction, and converges the dynamically deflected beams by an imaging optical system into point-like beam spots on a scan target surface.

Scanning optical systems are widely used for electrophotographic laser beam printers, digital photocopiers, laser fax machines, laser plotters, etc. for scanning the surface of a photosensitive body (photosensitive drum, etc.) as the scan target surface by a modulated beam.

One of conventional scanning optical systems is configured as follows. That is, the scanning optical system converges a laser beam (which has been ON-OFF modulated according to image information) by a line image formation lens to focus in the auxiliary scanning direction in the vicinity of a reflecting surface of the deflecting system, dynamically deflects the laser beam by the deflecting system in the main scanning direction, and converges the dynamically deflected laser beam by the imaging optical system into a spot beam on the scan target surface. By the above mentioned mechanism, the scanning optical system scans the ON-OFF modulated spot beam on the scan target surface in the main scanning direction at a constant speed, and thereby forms a two-dimensional image composed of a plurality of dots on the scan target surface.

Meanwhile, when a light source that emits a plurality of laser beams from a plurality of light emitting points (e.g. laser diodes) is used, a plurality of line images arranged in the auxiliary scanning direction can be formed in the vicinity of the reflecting surface of the deflecting system by use of the line image formation lens. Therefore, through the deflecting system and the imaging optical system, a plurality of spot beams arranged in the auxiliary scanning direction are formed on the scan target surface. By such a scanning optical system (the so-called "multibeam optical system"), a plurality of scan lines can be simultaneously drawn on the scan target surface in one scan by one reflecting surface of the deflecting system. Therefore, with the ON-OFF modulation of each beam according to the image information, high speed printing can be realized.

In addition to the above multibeam optical system, printers capable of switching the recording density (in order to change the printing speed) depending on the purpose are well known. This type of printer switches the recording density in the main scanning direction by changing the modulating cycle, while switching the recording density in the auxiliary scanning direction by changing the rotational speed of the photosensitive drum.

However, in the aforementioned multibeam optical system employing a light source having a plurality of light emitting points, the interval between the simultaneously scanned scan lines (hereinafter, referred to as "scan line interval") is fixed. With the fixed scan line interval, when the recording density in the auxiliary scanning direction is switched by changing the rotational speed of the photosensitive drum as above, a mismatch occurs between the interval between the simultaneously scanned scan lines (fixed scan line interval) and the interval between successively scanned scan lines.

To avoid the problem, there has been proposed a method capable of altering the recording density by changing the rotational speed of the photosensitive drum while maintaining an even interval between the scan lines formed on the scan target surface by the multibeam scanning optical system (Japanese Patent Provisional Publication No. SHO57-54914, for example). The scanning optical system disclosed in this publication employs an afocal anamorphic zoom lens system as the line image formation lens and synchronously moves a plurality of lenses of the afocal anamorphic zoom lens system in the optical axis direction. With this structure, the magnification of the whole line image formation lens can be changed while maintaining "focus positions" of the beams (where the beams after passing through the line image formation lens focus in the auxiliary scanning direction in the vicinity of the reflecting surface of the deflecting system) at fixed positions, by which the scan line interval can be adjusted continuously according to the rotational speed of the photosensitive drum.

However, when an anamorphic movable lens (cylindrical lens, etc.) is installed in the line image formation lens, a relative tilt of a lens surface caused by the movement of the anamorphic movable lens introduces a twist in the shape of the wavefront. In order to continuously change the magnification of the line image formation lens while suppressing the error caused by the relative tilt, a movement control mechanism composed of high precision parts becomes necessary and it drives up the costs.

SUMMARY OF THE INVENTION

The present invention is advantageous in that it provides a scanning optical system capable of resolving the above problems and realizing the switching of the scan line interval in the auxiliary scanning direction in the multibeam optical system extremely easily, without the need of a movement control mechanism composed of high precision parts.

According to an aspect of the invention, there is provided a scanning optical system for dynamically deflecting a plurality of beams simultaneously and thereby scanning the beams in a main scanning direction on a scan target surface. The scanning optical system is provided with a light source having a plurality of light emitting points which emit the plurality of beams and a collimator lens which collimates the plurality of beams, the plurality of beams being emitted from the light source as a plurality of collimated beams collimated by the collimator lens, a first optical system including a first fixed lens group placed on a light source side of the first optical system and a movable lens group having negative finite transverse magnification with respect to images formed by the first fixed lens group, the first optical system converging each of the plurality of beams emitted from the light source in an auxiliary scanning direction perpendicular to the main scanning direction.

The scanning optical system is further provided with a moving mechanism which holds the movable lens group to be movable along an optical axis of the collimator lens and selectively stops the movable lens group at a first position and a second position only, the first and second positions being determined so that transverse magnification $Mp_1$ of the movable lens group with respect to the images formed by the first fixed lens group when the movable lens group is placed at the first position and transverse magnification $Mp_2$ of the movable lens group with respect to the images formed by the first fixed lens group when the movable lens group is placed at the second position will satisfy $Mp_1 \times Mp_2 = 1$ . . . (1). The scanning optical system further provided with a deflecting system that dynamically deflects the plurality of beams simultaneously in the main scanning direction at a position in the vicinity of a line image formation position where a plurality of line images are formed by the convergence of the beams in the auxiliary scanning direction by the first optical system, and a second optical system which converges the dynamically deflected beams in the main scanning direction and in the auxiliary scanning direction to focus in the vicinity of the scan target surface and thereby forms a plurality of scan lines on the scan target surface.

With this configuration, the moving mechanism selectively stops the movable lens group only at the first and second positions which satisfy the condition (1), by which the distance between the object point and image point of the movable lens group when the movable lens is placed at the first position becomes equal to that when the movable lens is placed at the second position regardless of actual figures of the transverse magnifications $Mp_1$ and $Mp_2$ at the two positions. Consequently, the line images are formed at fixed positions even though the focal length (and thereby the magnification) of the whole first optical system can be changed between two values. Therefore, the switching of the scan line interval in the auxiliary scanning direction can be realized extremely easily by use of a simple moving mechanism that enables the movement between the two positions, without the need of a movement control mechanism composed of high precision parts.

Optionally, an interval P1 between the scan lines when the movable lens group is placed at the first position and an interval P2 between the scan lines when the movable lens group is placed at the second position may satisfy:

$$Mp_1 = -(P1/P2)^{1/2} = 1/Mp_2 \qquad (2).$$

Still optionally, the first optical system may consist of a first fixed lens group having negative refractive power in the auxiliary scanning direction and thereby forming the images as virtual images and a movable lens group having positive refractive power in the auxiliary scanning direction. Incidentally, in this case, in order to satisfy the condition "negative finite transverse magnification" of the movable lens group, the moving mechanism is required to move the movable lens group so that the front focal point of the movable lens group (either at the first position or at the second position) will be nearer to the deflecting system than the virtual images formed by the first fixed lens group.

In a particular case, the transverse magnification $Mp_1$ of the movable lens group in the auxiliary scanning direction when the movable lens group is placed at the first position may be approximately −1.41, and the transverse magnification $Mp_2$ of the movable lens group in the auxiliary scanning direction when the movable lens group is placed at the second position may be approximately −0.71.

Optionally, the first optical system may include the first fixed lens group having positive refractive power in the auxiliary scanning direction and thereby forming the images as real images, a movable lens group having negative refractive power in the auxiliary scanning direction and thereby forming virtual images of the real images, and a second fixed lens group having positive refractive power in the auxiliary scanning direction and thereby forming real images of the virtual images. In this case, in order to satisfy the condition "negative finite transverse magnification" of the movable lens group, the moving mechanism is required to move the movable lens group so that the rear focal point of the movable lens group (either at the first position or at the second position) will be nearer to the light source than the focal point of the first fixed lens group.

Still optionally, the transverse magnification $Mp_1$ of the movable lens group in the auxiliary scanning direction when the movable lens group is placed at the first position may be approximately −1.22, and the transverse magnification $Mp_2$ of the movable lens group in the auxiliary scanning direction when the movable lens group is placed at the second position may be approximately −0.82.

In a particular case, the moving mechanism includes a first fixed mount on which the first fixed lens group is mounted, a second fixed mount placed at a preset distance from the first fixed mount, a movable mount placed between the first and second fixed mounts on which the movable lens group is mounted, a guide held by the first and second fixed mounts and inserted into a through hole of the movable mount, a screw rotatably held by the first and second fixed mounts and inserted into a through hole of the movable mount having an engaging mechanism for smoothly engaging with the screw, and a rotating mechanism for rotating the screw. In this structure, the movable lens group is stopped at the first position when the movable mount makes contact with the first fixed mount, and the movable lens group is stopped at the second position when the movable mount makes contact with the second fixed mount.

Of course, the first optical system may also consist of a first fixed lens group having positive refractive power in the auxiliary scanning direction and thereby forming the images as real images and a movable lens group having positive refractive power in the auxiliary scanning direction. In this case, the moving mechanism moves the movable lens group so that the front focal point of the movable lens group (either at the first position or at the second position) will be nearer to the deflecting system than the real images formed by the first fixed lens group.

BRIEF DESCRIPTION OF THE ACCOMPANYING DRAWINGS

The objects and features of the present invention will become more apparent from the consideration of the following detailed description taken in conjunction with the accompanying drawings, in which.

DETAILED DESCRIPTION OF THE EMBODIMENTS

Figure 1:
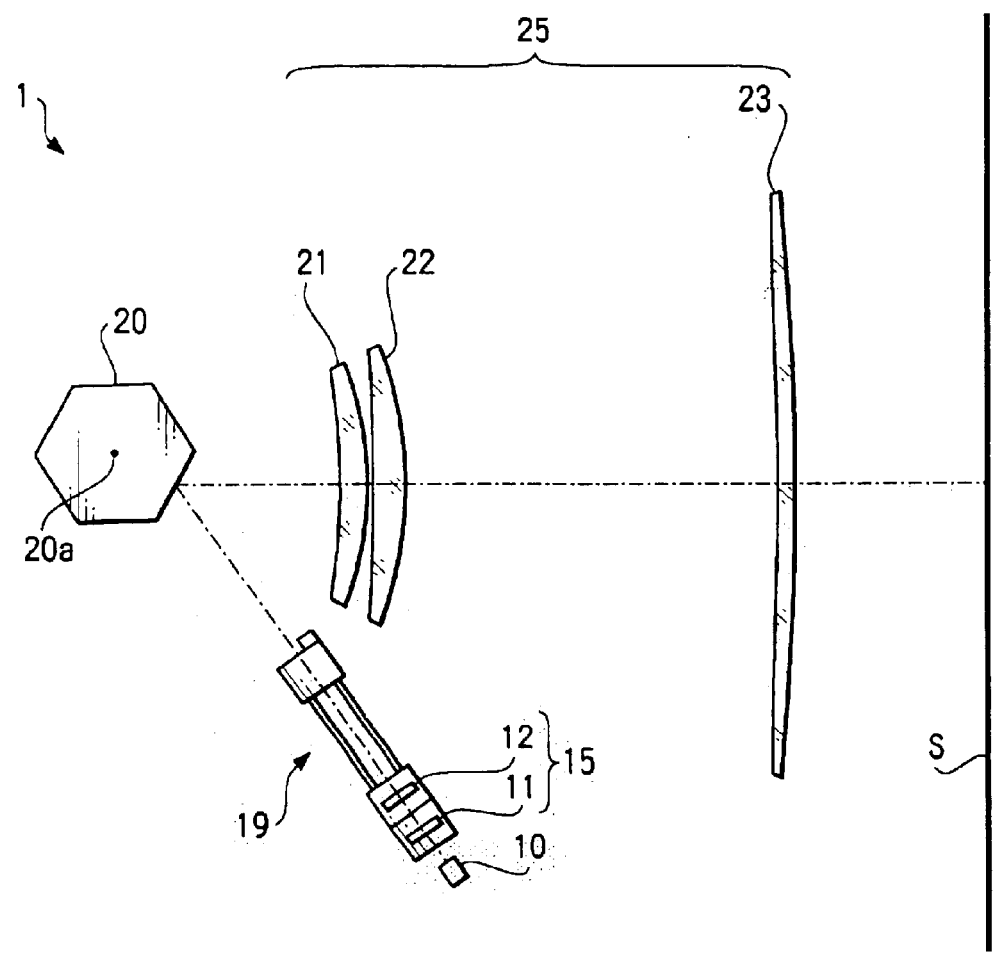
FIG. 1 is an optical block diagram showing the optical composition (in a main scanning plane) of a scanning optical system in accordance with a first embodiment of the present invention in a first state.

Referring now to the drawings, a description will be given in detail of preferred embodiments in accordance with the present invention.

First Embodiment

Figure 2:
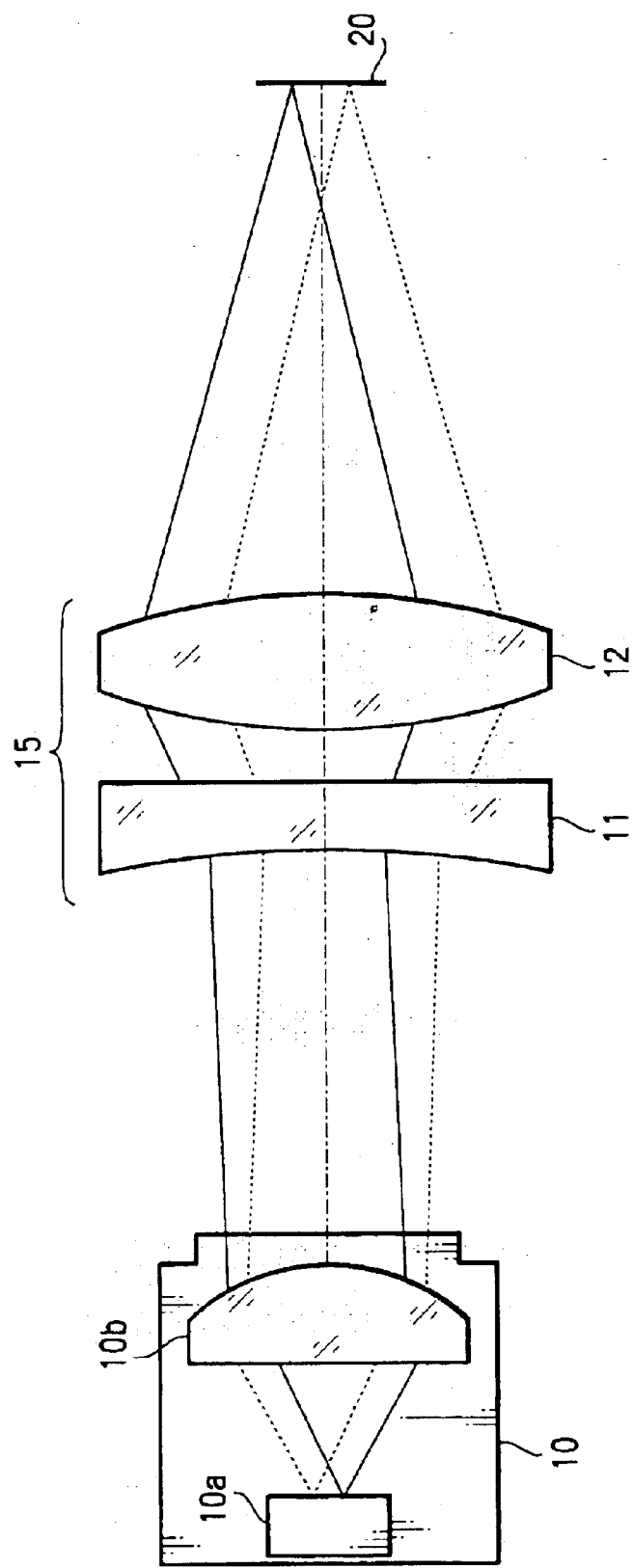
FIG. 2 is a schematic optical block diagram showing the optical composition of a first optical system of the scanning optical system of the first embodiment in an auxiliary scanning direction.

FIG. 1 is an optical block diagram showing the composition of a scanning optical system 1 in accordance with a first embodiment of the present invention. FIG. 1 is a top view of the scanning optical system 1 viewed along line parallel with a central axis 20a of a polygonal mirror 20. FIG. 2 is a schematic optical block diagram showing the composition of a light source unit 10 and a first optical system 15 of the scanning optical system 1. FIG. 2 is a side view of the scanning optical system 1 viewed along a line perpendicular to the central axis 20a of the polygonal mirror 20.

For the simplicity of the following explanation, the "main scanning direction" is defined as a direction in which a beam spot is scanned on a scan target surface S, and the "auxiliary scanning direction" is defined as a direction perpendicular to the main scanning direction on the scan target surface. In the following description, the shape of optical elements, directions of powers of the optical elements and the like are described with reference to the main and auxiliary scanning directions on the scan target surface. That is, if an optical element is described to have a refractive power in the main scanning direction, the power affects the beam in the main scanning direction on the scan target surface.

Further, a plane that contains an optical axis of a second optical system 25 and that is perpendicular to the central axis 20a of the polygon mirror 20 will be called "main scanning plane", and a plane that contains the optical axis of the second optical system 25 and that is parallel to the central axis 20a of the polygon mirror 20 will be called "auxiliary scanning plane". A light source side and a scan target surface side are defined as a front side and a rear side, respectively. That is, the light source unit 10 is located at the front end of an optical path, and the scan target surface S is located at the rear end of the optical path.

As shown in FIGS. 1 and 2, the scanning optical system 1 includes the light source unit 10 for emitting a plurality of collimated beams, the first optical system 15 for converging each of the collimated beams emitted by the light source unit 10 only in the auxiliary scanning direction and thereby forming a plurality of line images, a holder 19 for holding the first optical system 15, the polygon mirror 20 in the shape of a regular polygonal prism (as a deflecting system rotating about its central axis) having side faces formed as reflecting surfaces for reflecting the laser beams, and the second optical system 25 for converging each of the laser beams (that have been reflected and dynamically deflected by a reflecting surface of the revolving polygon mirror 20) into abeam spot on the outer surface of a photosensitive drum (scan target surface S).

As shown in FIG. 2, the light source unit 10 includes a semiconductor laser array 10a as a light source for emitting a plurality of diverging laser beams from a plurality of light emitting points arranged in the auxiliary scanning direction, and a collimator lens 10b for collimating the diverging laser beams emitted by the semiconductor laser array 10a into collimated beams. The first optical system 15 includes, from the light source side of the first optical system 15, a first cylindrical lens 11 having negative refractive power in the auxiliary scanning direction, and a second cylindrical lens 12 having positive refractive power in the auxiliary scanning direction. The first cylindrical lens 11 and the second cylindrical lens 12 correspond to a "fixed lens group" and a "movable lens group", respectively.

The first cylindrical lens 11 and the second cylindrical lens 12 constitute a line image formation optical system, which converges the laser beams emerged from the collimator lens 10b as collimated beams only in the auxiliary scanning direction and thereby forms a plurality of line images on its focal plane. The second cylindrical lens 12 is held by the holder 19 (which is attached to an unshown frame) so as to be movable along an optical axis of the collimator lens 10b. The details of the holder 19 will be described later.

The polygon mirror 20 is placed so that each laser beam emerging from the second cylindrical lens 12 of the first optical system 15 will be incident on one of its reflecting surfaces always obliquely in regard to the main scanning plane and each line image formed by the second cylindrical lens 12 will be positioned in the vicinity of the reflecting surface. In other words, a "conjugate relationship" (regarding the collimator lens 10b and the first optical system 15) holds in the auxiliary scanning direction between each light emitting point of the semiconductor laser array 10a and the vicinity of the reflecting surface of the polygon mirror 20.

Since the polygon mirror 20 rotates about its central axis 20a, the incident angle of each laser beam with respect to the reflecting surface (measured in the main scanning direction) changes, by which each laser beam is dynamically deflected in the main scanning direction.

Each laser beam dynamically deflected by the polygon mirror 20 travels into the second optical system 25 maintaining its parallelism regarding the main scanning direction while diverging from the convergence point regarding the auxiliary scanning direction, and enters the second optical system 25 as an imaging optical system having a scanning speed correction function. Regarding the main scanning direction, the second optical system 25 focuses each incident laser beam at a position on the scan target surface S that is y=k·θ apart from the optical axis (k: scanning coefficient, θ: tilt angle of the laser beam relative to the optical axis). Regarding the auxiliary scanning direction, the second optical system 25 focuses the incident laser beam on the scan target surface S at an opposite side of the incident beam with respect to the optical axis. Therefore, a plurality of beam spots are formed on the scan target surface S, and the beam spots on the scan target surface S are scanned in the main scanning direction at a constant speed.

Since the second optical system 25 sets the scan target surface S almost conjugate (in regard to the auxiliary scanning direction) with the vicinity of the reflecting surface of the polygon mirror 20, each laser beam which formed a line image in the vicinity of the reflecting surface is focused again at a position having a certain height on the scan target surface S regardless of the presence/absence of a so-called "facet error" (i.e., a slight tilting of each reflecting surface). Consequently, a plurality of scan lines are drawn with the same pitch (interval) on the scan target surface S regardless of which reflecting surface of the polygon mirror 20 reflects the laser beams.

Figure 3:
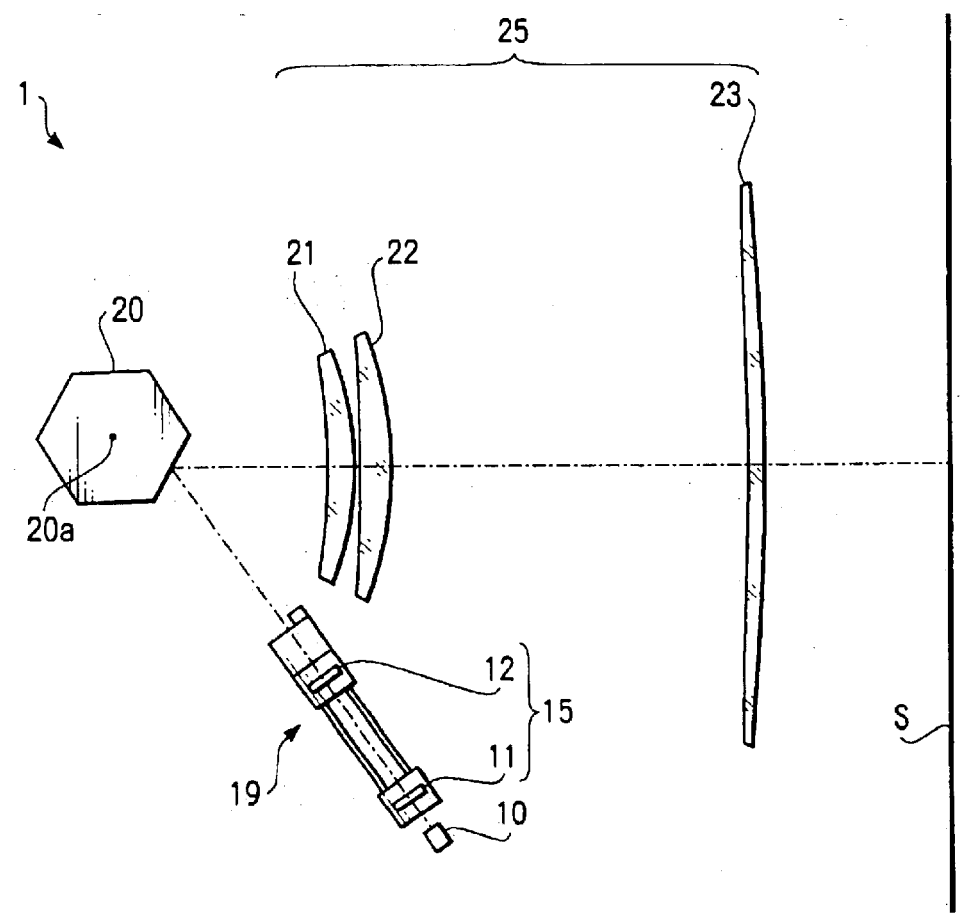
FIG. 3 is an optical block diagram showing the optical composition (in the main scanning plane) of the scanning optical system of the first embodiment in a second state.

FIG. 3 is an optical block diagram showing a state of the scanning optical system in which the second cylindrical lens 12 has been moved rearward along the optical axis of the collimator lens 10b to a "second position" from an initial position ("first position") shown in FIG. 1. The pitch (periodic interval) of the line images formed in the vicinity of the reflecting surface of the polygon mirror 20 by the laser beams emitted from the light emitting points of the light source unit 10 equals the pitch (periodic interval) of the light emitting points of the semiconductor laser array 10a multiplied by the magnification of the collimator lens 10b and the first optical system 15 in the auxiliary scanning direction.

Therefore, the pitch of the line images can be adjusted properly by changing the focal length of the first optical system 15 regarding the auxiliary scanning direction by moving the second cylindrical lens 12 in the optical axis direction as shown in FIG. 3. However, if the focal length of the first optical system 15 is changed by steplessly moving the second cylindrical lens 12 only, a shift of line image formation positions (positions of the line images formed in the vicinity of the reflecting surface) occurs with the movement of the second cylindrical lens 12.

Figures 4A, 4B:
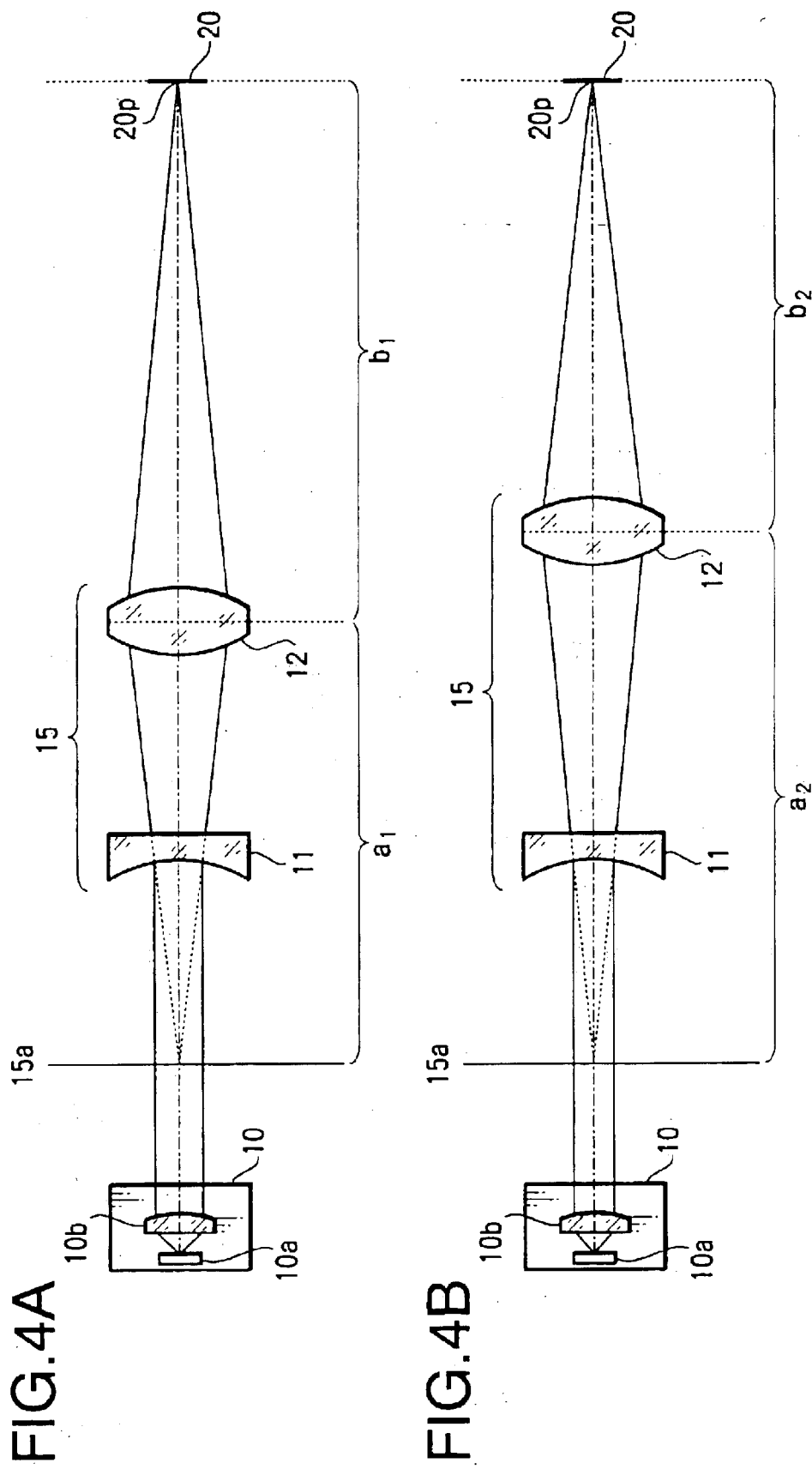
FIGS. 4A and 4B are explanatory drawings showing a first state and a second state of the first optical system respectively.

This phenomenon will be explained in detail below. FIG. 4A is an explanatory drawing of the scanning optical system of the first embodiment in the auxiliary scanning plane. In FIG. 4A, optical elements after the polygon mirror 20 are omitted and only one light emitting point is shown for the sake of simplicity.

In FIG. 4A, a virtual image of a light emitting point of the semiconductor laser array 10a (determined by the magnification of the collimator lens 10b and the first cylindrical lens 11) is formed at a virtual image formation point 15a (i.e., an image point of the first cylindrical lens 11 or an object point of the second cylindrical lens 12) which is determined by the position and focal length of the first cylindrical lens 11. Meanwhile, the line image formation position 20p (i.e., an image point of the second cylindrical lens 12) is determined by the position (relative to the object point 15a) and focal length of the second cylindrical lens 12.

At this point, if the pitch of the line images is adjusted by changing the transverse magnification by moving the second cylindrical lens 12 in the optical axis direction, not only the magnification but also the position of its image point changes. In other words, even if we attempted to adjust the pitch of the line images by changing the focal length of the first optical system 15 by moving the second cylindrical lens 12 in the optical axis direction with a simple moving mechanism, the line image formation position 20p shifts from the position in the vicinity of the reflecting surface of the polygon mirror 20 and the focal point shifts from the scan target surface S.

In order to resolve this problem, in this embodiment, the second cylindrical lens 12 is selectively moved between first and second positions by the holder 19 (as the moving mechanism) so that $Mp_1$ (transverse magnification of the second cylindrical lens 12 in the auxiliary scanning direction with respect to the object point 15a in a first state where the second cylindrical lens 12 is placed at the first position) and $Mp_2$ (transverse magnification of the second cylindrical lens 12 in the auxiliary scanning direction with respect to the object point 15a in a second state where the second cylindrical lens 12 is placed at the second position) will be both negative and finite and satisfy the following equation (1).

$$Mp_1 \times Mp_2 = 1 \tag{1}$$

When the equation (1) is satisfied, the transverse magnifications $Mp_1$ and $Mp_2$ in the auxiliary scanning direction also satisfy:

$$Mp_1 = -(P1/P2)^{1/2} = 1/Mp_2 \tag{2}$$

where "P1" is the scan line interval (pitch) on the scan target surface S in the first state and "P2" is the scan line interval (pitch) on the scan target surface S in the second state.

In the following, the equations (1) and (2) will be explained referring to FIGS. 4A and 4B showing the first and second states respectively.

As is well known, in the first state shown in FIG. 4A, the imaging relationship by the first optical system 15 is expressed as:

$$1/b_1 = 1/a_1 + 1/f \tag{3}$$

where "$a_1$" denotes the distance from the second cylindrical lens 12 to its object point 15a, and "$b_1$" denotes the distance from the second cylindrical lens 12 to its image point 20p. Incidentally, $a_1$ is negative and $b_1$ is positive in the equation (3).

In this case, the magnification $Mp_1$ of the second cylindrical lens 12 is expressed as:

$$Mp_1 = b_1/a_1 \tag{4}$$

Thus, the distance $U_1$ between the object point 15a and the image point 20p of the second cylindrical lens 12 is expressed as:

$$U_1 = |a_1| + |b_1| = f(2 - Mp_1 - 1/Mp_1) \tag{5}$$

Similarly, in the second state shown in FIG. 4B, the imaging relationship by the first optical system 15 is expressed as:

$$1/b_2 = 1/a_2 + 1/f \tag{6}$$

and the distance $U_2$ between the object point 15a and the image point 20p of the second cylindrical lens 12 is expressed as:

$$U_2 = f(2 - Mp_2 - 1/Mp_2) \tag{7}$$

where "$a_2$" is the distance from the second cylindrical lens 12 to its object point 15a and "$b_2$" is the distance from the second cylindrical lens 12 to its image point 20p ($a_2$ is negative and $b_2$ is positive).

Therefore, when the holder 19 selectively moves the second cylindrical lens 12 between the first and second positions which satisfy the conditions (1) or (2), $U_1 = U_2$ is satisfied regardless of actual figures of the transverse magnifications $Mp_1$ and $Mp_2$ (i.e., regardless of actual figure of the magnification of the whole first optical system 15), by which the conjugate relationship between the virtual image formation point 15a and the vicinity of the reflecting surface of the polygon mirror 20 is maintained consistently.

Therefore, the line image formation position 20p does not move even if the magnification of the second cylindrical lens 12 with respect to the virtual image of each light emitting point formed at the virtual image formation point 15a (i.e. the magnification of the whole first optical system 15) is changed between two possible values (which satisfy the condition (1)) by moving the second cylindrical lens 12 between the first and second positions. To sum up, the magnification of the collimator lens 10b and the first optical system 15 with respect to each light emitting point of the semiconductor laser array 10a can be changed between two possible values without causing the shift of the line image formation position 20p.

Figure 5:
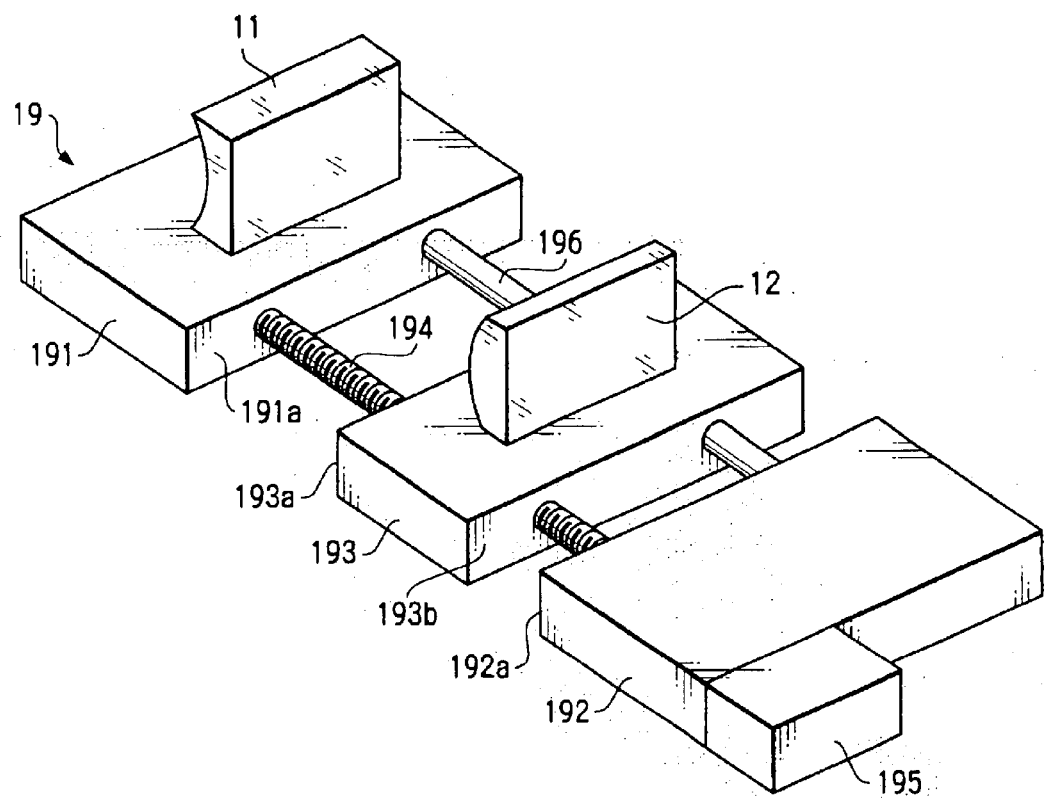
FIG. 5 is a perspective view showing an example of the composition of a holder.

FIG. 5 is a perspective view showing an example of the composition of the holder 19. The light source unit 10 (unshown in FIG. 5) is located on the upper left side of the holder 19 shown in FIG. 5, and the polygon mirror 20 is located on the lower right side of the holder 19. As shown in FIG. 5, the holder 19 is composed of a pair of fixed mounts 191 and 192 which are fixed to the unshown frame, a movable mount 193 placed between the fixed mounts 191 and 192, a rotational screw (i.e., a ball screw) 194, a motor 195 for turning the ball screw 194, and a guide 196.

The fixed mounts 191 and 192 having rectangular parallelepiped shapes are fixed to the unshown frame so as to face each other at a preset distance. The surfaces of the fixed mounts 191 and 192 facing each other will be called "contact surfaces 191a and 192a", respectively. Between the fixed mounts 191 and 192, the movable mount 193 having a rectangular parallelepiped shape is placed with its contact surfaces 193a and 193b facing the contact surfaces 191a and 192a, respectively.

The first cylindrical lens 11 is fixed on the fixed mount 191 at the front end of the holder 19, and the second cylindrical lens 12 is fixed on the movable mount 193 in the middle of the holder 19. Incidentally, the first and second cylindrical lenses 11 and 12 are both located on the optical axis of the collimator lens 10b. The rotation axis of generating lines of each cylindrical lens (11, 12) is orthogonal to the optical axis of the collimator lens 10b.

The ball screw 194 and the guide 196 are placed to be in parallel with the optical axis of the collimator lens 10b and to penetrate the mounts (fully penetrate the movable mount 193). Inside a through hole of the movable mount 193 for the ball screw 194, an unshown ball nut is set so as to engage with the ball screw 194 via unshown balls. Unshown locking mechanisms of the fixed mounts 191 and 192 prevents the ball screw 194 from moving in the optical axis direction, allowing the ball screw 194 a rotational movement only. The guide 196 is fixed to the fixed mounts 191 and 192 and is inserted into another through hole of the movable mount 193 with appropriate clearance. Therefore, by turning the ball screw 194, the movable mount 193 can be moved between the fixed mounts 191 and 192 along the ball screw 194 and the guide 196 (along the optical axis of the collimator lens 10b), by which the second cylindrical lens 12 can be moved along the optical axis of the collimator lens 10b.

The first optical system 15 stays in the first state (satisfying the conditions (1) and (2)) when the contact surface 193a of the movable mount 193 is in contact with the contact surface 191a of the fixed mount 191, and stays in the second state (satisfying the conditions (1) and (2)) when the contact surface 193b of the movable mount 193 is in contact with the contact surface 192a of the fixed mount 192.

The motor 195 connected to the ball screw 194 is mounted on the rear surface of the fixed mount 192 in order to turn the ball screw 194. The motor 195 is provided with an unshown encoder. An unshown drive circuit supplies drive current to the motor 195 according to a pulse signal supplied from the encoder and thereby carries out ON-OFF control of the rotation of the ball screw 194. For example, when the first optical system 15 is switched from the first state to the second state, the motor 195 first turns the ball screw 194 to move the movable mount 193 rearward. During the movement, the encoder keeps outputting the pulse signal to the drive circuit of the motor 195. When the contact surface 193b of the movable mount 193 makes contact with the contact surface 192a of the fixed mount 192 and the pulse signal stops due to heavy load on the motor 195, the drive circuit stops driving the motor 195 and the motor 195 stops turning the ball screw 194.

As described above, the holder 19 drives the movable mount 193 between preset positions and thereby switches the position of the second cylindrical lens 12 on the optical axis of the collimator lens 10b. Thus, by building up the holder 19 so as to stop or hold the second cylindrical lens 12 at the two positions satisfying the conditions (1) and (2) in the first and second states, the switching of the scan line interval (measured in the auxiliary scanning direction) can be realized by the ON-OFF control of the motor 195 and the control of the direction of rotation of the motor 195. Thus, the holder 19 as the moving mechanism can be constructed with fairly simple design.

Incidentally, the moving mechanism for moving the second cylindrical lens 12 is not limited to the above configuration. Any configuration of the moving mechanism is possible as long as it enables the movement of the second cylindrical lens 12 between the first and second positions.

In order to actually change the printing speed, the user turns an unshown "print setting switch" to the other side, by which the second cylindrical lens 12 is driven by the motor 195 frontward or rearward and thereby the first optical system 15 is switched between the first and second states. An unshown control circuit sets the auxiliary scanning magnification (magnification in the auxiliary scanning direction) of the first optical system 15 and the rotational speed of the photosensitive drum higher in the first state than in the second state. Therefore, the pitch (interval) of the scan lines is set longer in the first state than in the second state. In the second state, the auxiliary scanning magnification of the first optical system 15 and the rotational speed of the photosensitive drum are set lower, and the scan line interval is set shorter.

For example, when the user turns the print setting switch from "fast" to "fine", the second cylindrical lens 12 is moved from the first position to the second position by the moving mechanism, while the rotational speed of the photosensitive drum is set to a second speed which is relatively slow, by which the user can obtain a high quality (high definition) print image. On the other hand, when the user turns the print setting switch from "fine" to "fast", the second cylindrical lens 12 is returned from the second position to the first position, while the rotational speed of the photosensitive drum is set to a first speed which is relatively fast, by which the user can obtain a print image faster than in "fine". The definition or resolution of the print image obtained by "fast" is relatively lower than that by "fine".

In the following, a concrete example of the scanning optical system according to the first embodiment will be explained in detail.

EXAMPLE OF FIRST EMBODIMENT

Incidentally, there are cases where a surface of a lens (21, 22, 23) included in the second optical system 25 is an aspherical surface having no rotational symmetry axis. In such cases, the "optical axis" in its original meaning can not be defined for such a lens surface. Therefore, the term "optical axis" will hereafter be used in the meaning of an axis (optical reference axis) passing through an "origin" that is set when the shape of the lens surface is described in a mathematical expression.

FIGS. 1 and 3 are optical block diagrams showing the composition of the scanning optical system of this embodiment in the main scanning plane, in which FIG. 1 shows the first state and FIG. 3 shows the second state.

In this example of the first embodiment, the scanning coefficient k is 180, and the focal length of the whole second optical system 25 is 180 mm. The auxiliary scanning magnification is −0.457×, and the scan width on the scan target surface S (the width of laser beam scan measured in the main scanning direction) is 216 mm.

The focal length of the collimator lens 10b of the light source unit 10 is 15 mm. The pitch (interval) of the light emitting points of the semiconductor laser array 10a is 14 µm.

The focal lengths of the first and second cylindrical lenses 11 and 12 are −70.381 mm and 49.621 mm, respectively.

The transverse magnification $Mp_1$ of the second cylindrical lens 12 in the auxiliary scanning direction in the first state is −1.41, and the transverse magnification $Mp_2$ of the second cylindrical lens 12 in the auxiliary scanning direction the second state is −0.71.

The following Table 1 shows concrete numerical configuration of the optical surfaces existing on the optical path from the first optical system 15 to the scan target surface S in the example. Incidentally, the numerical data shown in Table 1 are paraxial data measured in the vicinity of the optical axis of collimator lens 10b or the second optical system 25.

TABLE 1

| SURFACE No. | Ry | Rz | SURFACE INTERVAL | n |
|---|---|---|---|---|
| First Cylindrical Lens | ∞ | −35.945 | 3.00 | 1.51072 |
|  | ∞ |  | D1 |  |
| Second Cylindrical Lens | ∞ | 50.000 | 4.00 | 1.51072 |
|  | ∞ | −50.000 | D2 |  |
| Polygonal Mirror |  |  | 50.00 |  |
| 1 | −198.000 |  | 8.25 | 1.48617 |
| 2 | −103.850 |  | 2.00 |  |
| 3 | −1083.220 |  | 10.00 | 1.48617 |
| 4 | −130.000 |  | 115.65 |  |
| 5 | −1000.000 | 24.467 | 5.00 | 1.48617 |
| 6 | −1000.000 |  | 60.30 |  |

In Table 1, each number in the column "SURFACE No." indicates the surface number of each lens surface of the second optical system 25, in which No.1 and No.2 denote front and rear surfaces of a first lens 21, No.3 and No.4 denote front and rear surfaces of a second lens 22, and No.5 and No.6 denote front and rear surfaces of a third lens 23.

The character "Ry" denotes the curvature radius [mm] in the main scanning direction, and "Rz" denotes the curvature radius [mm] in the auxiliary scanning direction (omitted when the surface has rotational symmetry (Rz=Ry)). The "SURFACE INTERVAL" denotes the distance [mm] between a surface and a next surface measured on the optical axis, and "n" denotes the refractive index of a medium between the surface and the next surface in regard to a design wavelength 780 nm (omitted for air). The values "D1" and "D2" shown in the "SURFACE INTERVAL" are variables. The change of the variables "D1" and "D2" is shown in Table 4.

The first cylindrical lens 11 shown in Table 1 has a cylindrical front surface (concave) and a plane rear surface. The second cylindrical lens 12 has a cylindrical front surface (convex) and a cylindrical rear surface (convex).

The lens surfaces No.1 and No.2 of the second optical system 25 are both rotationally symmetrical aspherical surfaces. Therefore, the sectional shape of each lens surface is expressed by the following equation (8) as a SAG amount X(h) which is a distance between a point (having a height h from the optical axis) on the lens surface and a tangential plane contacting the lens surface on the optical axis.

$$X(h)=1/Ry \cdot h^2/\{1+[1-(\kappa+1)^2 h^2/Ry^2]^{1/2}\}+A_4 h^4+A_6 h^6+A_8 h^8 \qquad (8)$$

In the equation (8), "Ry" denotes the curvature radius Ry which has been shown in Table 1, "κ" denotes a conical coefficient, "$A_4$", "$A_6$" and "$A_8$" denote aspherical coefficients of fourth, sixth and eighth orders, respectively. The coefficients of the equation (8) specifying the particular shapes of the lens surfaces No.1 and No.2 of this example will be shown in the following Table 2.

TABLE 2

|  | No. 1 | No. 2 |
|---|---|---|
| κ | 0.0 | 0.0 |
| $A_4$ | −8.66207E−08 | −2.64892E−08 |
| $A_6$ | 2.51495E−10 | 1.29004E−10 |
| $A_8$ | −1.49724E−14 | 3.21371E−14 |

The lens surface No.5 of the third lens 23 of the second optical system 25 is an anamorphic aspherical surface whose cross section in the main scanning direction is defined by a function of a height from the optical axis in the main scanning direction and whose curvature of a cross section in the auxiliary scanning direction is defined by a function of a height from the optical axis in the main scanning direction.

Therefore, the shape of the lens surface in the main scanning plane is expressed by the following equation (9) as a SAG amount X(y) which is a distance between a point (having a height y from the optical axis in the main scanning direction) on the lens surface and a tangential plane contacting the lens surface on the optical axis, and the shape of the lens surface in the auxiliary scanning direction at each height y is an arc having an arc curvature 1/[Rz(y)] expressed by the following equation (10).

$$X(y)=1/Ry \cdot y^2/\{1+[1-(\kappa+1)^2 y^2/Ry^2]^{1/2}\}+AM_1 y+AM_2 y^2+AM_3 y^3+AM_4 y^4+AM_5 y^5+AM_6 y^6+AM_7 y^7+AM_8 y^8 \qquad (9)$$

$$1/[Rz(y)]=1/Rz+AS_1 y+AS_2 y^2+AS_3 y^3+AS_4 y^4+AS_5 y^5+AS_6 y^6+AS_7 y^7+AS_8 y^8 \qquad (10)$$

In the equations (9) and (10), "Ry" denotes the curvature radius Ry in the main scanning direction which has been shown in Table 1, "Rz" denotes the curvature radius Rz in the auxiliary scanning direction which has been shown in Table 1, "κ" denotes the conical coefficient, "$AM_1$", "$AM_2$", "$AM_3$", "$AM_4$", "$AM_5$", "$AM_6$", "$AM_7$", "$AM_8$" . . . denote aspherical coefficients of each order in regard to the main scanning direction, and "$AS_1$", "$AS_2$", "$AS_3$", "$AS_4$", "$AS_5$", "$AS_6$", "$AS_7$", "$AS_8$" . . . denote aspherical coefficients of each order in regard to the auxiliary scanning direction. The coefficients of the equations (9) and (10) specifying the particular shape of the lens surface No.5 of this example will be shown in the following Table 3.

TABLE 3

| $AM_1$ = | 0.00000E−00 | $AS_1$ = | 0.00000E−00 |
| $AM_2$ = | 0.00000E−00 | $AS_2$ = | −8.84504E−07 |
| $AM_3$ = | 0.00000E−00 | $AS_3$ = | 0.00000E−00 |
| $AM_4$ = | 4.28542E−08 | $AS_4$ = | 2.20583E−11 |
| $AM_5$ = | 0.00000E−00 | $AS_5$ = | 0.00000E−00 |
| $AM_6$ = | −9.52269E−13 | $AS_6$ = | 0.00000E−00 |

TABLE 3-continued

| | | | |
|---|---|---|---|
| $AM_7 =$ | 0.00000E-00 | $AS_7 =$ | 0.00000E-00 |
| $AM_8 =$ | 0.00000E-00 | $AS_8 =$ | 0.00000E-00 |

In the scanning optical system 1 of the example of the first embodiment with the above concrete numerical configuration, the change of state between the first and second states causes changes in the focal length of the whole first optical system 15, the auxiliary scanning magnification of the whole scanning optical system 1, and the beam interval (scan line interval), as shown in the following Table 4.

TABLE 4

| | D1 | D2 | FOCUS LENGTH (FIRST OPTICAL SYSTEM) | MAGNIFICATION (WHOLE SCANNING OPTICAL SYSTEM) | BEAM INTERVAL |
|---|---|---|---|---|---|
| FIRST STATE | 11.10 | 118.40 | 99.25 | 3.02x | 42.3 μm |
| SECOND STATE | 46.20 | 83.30 | 49.69 | 1.51x | 21.2 μm |

In Table 4, "D1" and "D2" are the "SURFACE INTERVAL" D1 and D2 shown in Table 1. The "BEAM INTERVAL" denotes the interval between the scan lines scanned on the scan target surface S.

Figure 6A:
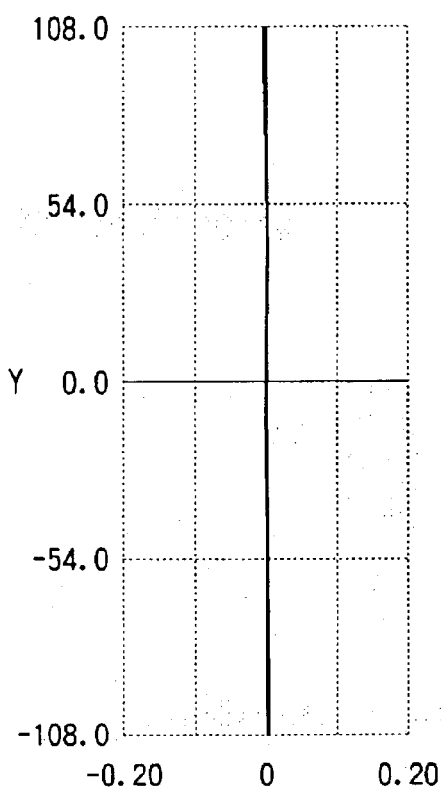
FIGS. 6A and 6B are graphs showing aberrations of a second optical system of the scanning optical system of the first embodiment.
Figure 6B:
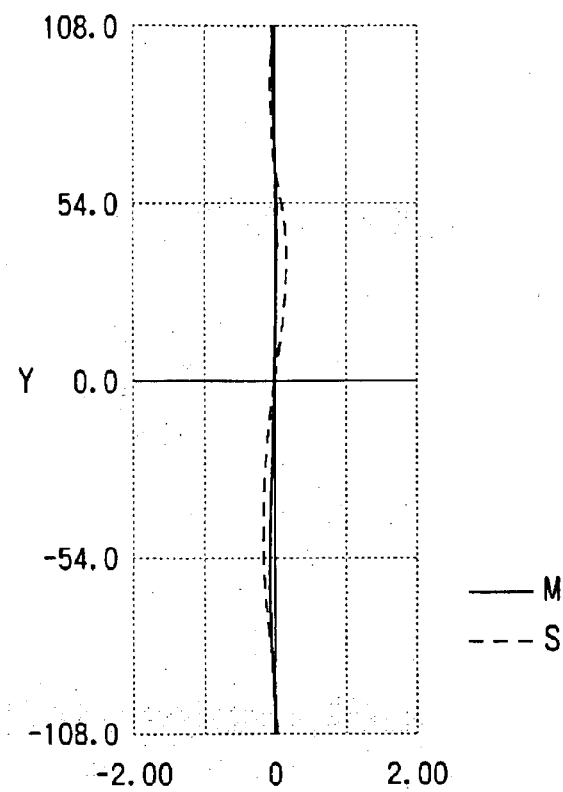

FIGS. 6A and 6B are graphs showing aberrations of the second optical system 25 of the scanning optical system 1 of the first embodiment. FIG. 6A shows fθ error, in which the vertical axis denotes the height y from the optical axis on the scan target surface S (which is determined by y=kθ), and the horizontal axis denotes deviation of actual spot position on the scan target surface S from y in the main scanning direction. FIG. 6B shows curvature of field, in which the vertical axis denotes the height y from the optical axis on the scan target surface S, and the horizontal axis denotes the shift of focus position in the optical axis direction ("S" (solid line) shows the data in the auxiliary scanning direction and "M" (dotted line) shows the data in the main scanning direction).

As described above, by the scanning optical system in accordance with the first embodiment of the present invention, the switching of the scan line interval in the auxiliary scanning direction in the multibeam optical system can be executed correctly (avoiding optical errors) and with extreme ease, without the need of using a movement control mechanism composed of high precision parts.

Second Embodiment

Figure 7:
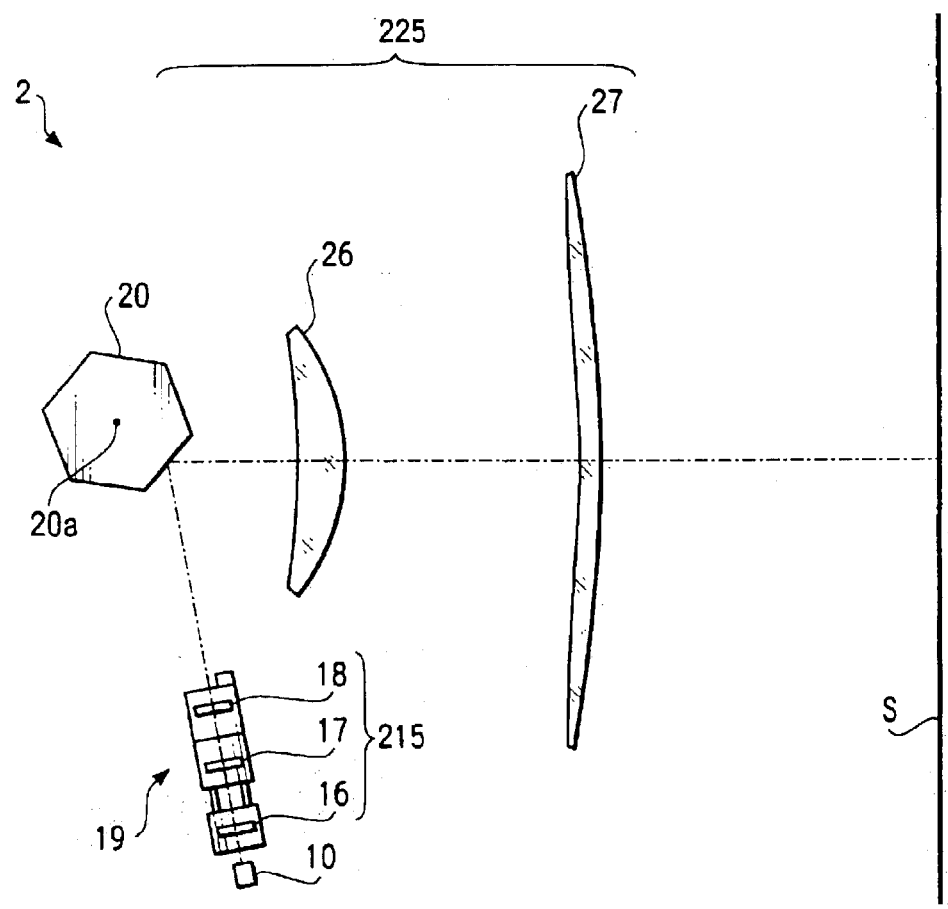
FIG. 7 is an optical block diagram showing the optical composition (in the main scanning plane) of a scanning optical system in accordance with a second embodiment of the present invention in the first state.
Figure 8:
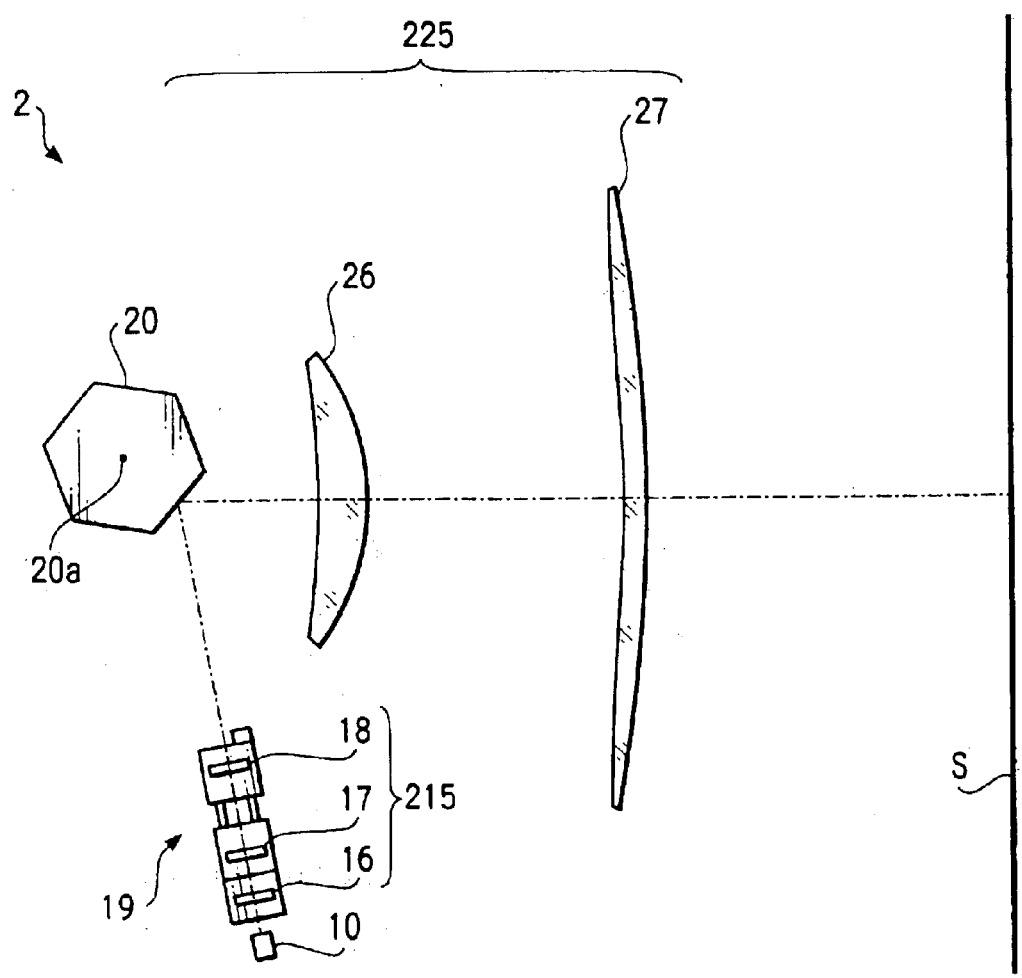
FIG. 8 is an optical block diagram showing the optical composition (in the main scanning plane) of the scanning optical system of the second embodiment in the second state.

FIGS. 7 and 8 are optical block diagrams showing the composition (in the main scanning plane) of a scanning optical system 2 in accordance with a second embodiment of the present invention, in which FIG. 7 shows the first state and FIG. 8 shows the second state. The definitions of the first and second states in the second embodiment are the same as those in the first embodiment. In FIGS. 7 and 8, elements equivalent to those of the first embodiment are shown with the same reference numerals.

In the second embodiment, cylindrical lenses forming A first optical system 215 include: a first cylindrical lens 16 having positive refractive power in the auxiliary scanning direction; a second cylindrical lens 17 having negative refractive power in the auxiliary scanning direction; and a third cylindrical lens 18 having positive refractive power in the auxiliary scanning direction. The first cylindrical lens 16, the second cylindrical lens 17 and the third cylindrical lens 18 correspond to a "first fixed lens group", a "movable lens group" and a "second fixed lens group", respectively.

The first cylindrical lens 16, the second cylindrical lens 17 and the third cylindrical lens 18 are fixed on the fixed mount 191, the movable mount 193 and the fixed mount 192 of the holder 19, respectively. Incidentally, the first through third cylindrical lenses 16–18 are all located on the optical axis of the collimator lens 10b. The rotation axis of generating lines of each cylindrical lens (16, 17, 18) is perpendicular to the optical axis of the collimator lens 10b.

Also in the second embodiment, the magnification of the whole first optical system 215 is changed by moving the second cylindrical lens 17. Thus, in the second embodiment, $Mp_1$ and $Mp_2$ in the conditional expressions (1) and (2) are defined as transverse magnifications of the second cylindrical lens 17 with respect to an image point 15a of the first cylindrical lens 16 which will be explained later. Also in the second embodiment, the second state is defined as the state where the contact surface 193a of the movable mount 193 is in contact with the contact surface 191a of the fixed mount 191, and the first state is defined as the state where the contact surface 193b of the movable mount 193 is in contact with the contact surface 192a of the fixed mount 192.

Figures 9A, 9B:
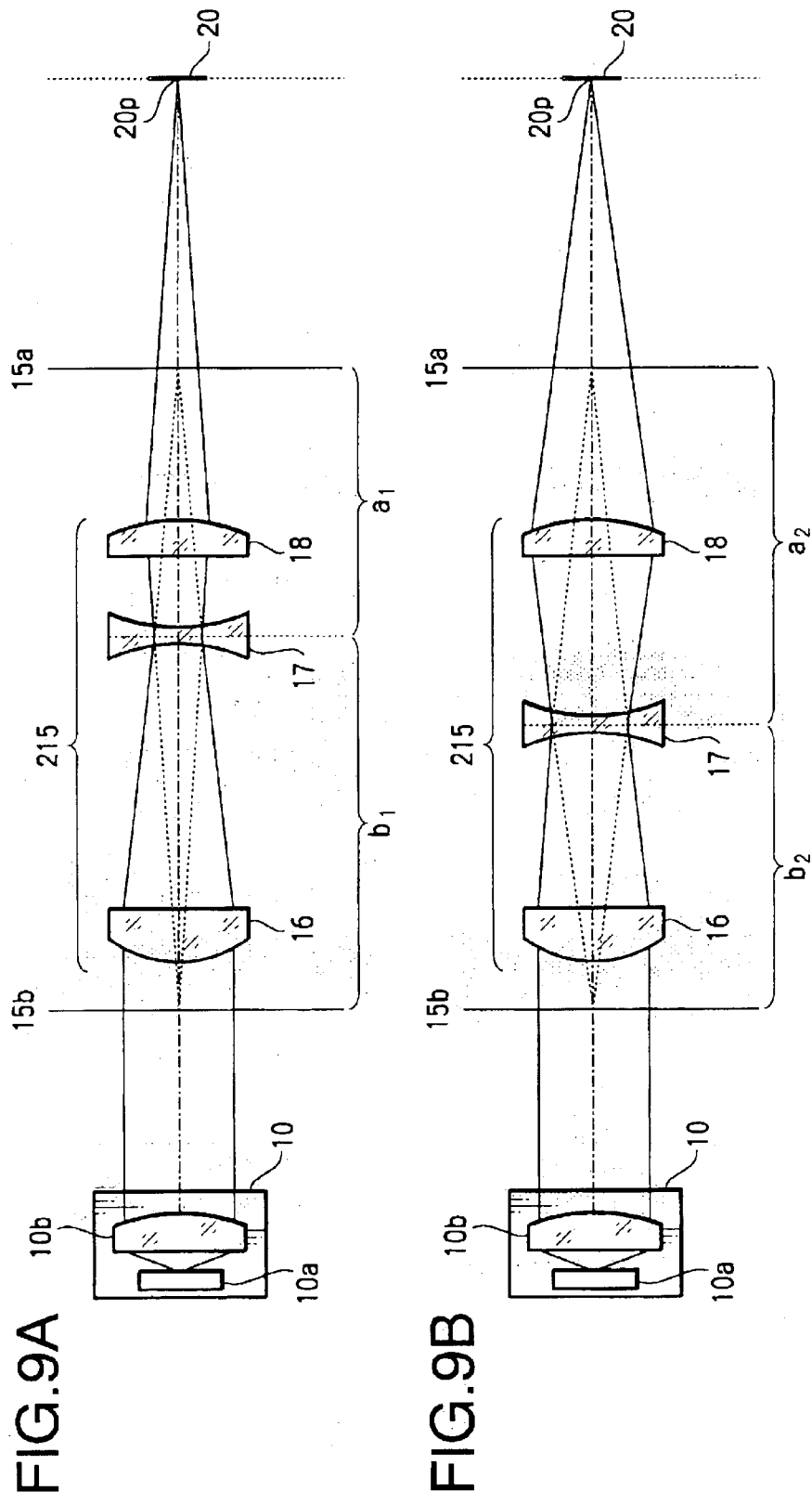
FIGS. 9A and 9B are explanatory drawings showing the first and second states of the first optical system of the scanning optical system of the second embodiment respectively.

FIGS. 9A and 9B are explanatory drawings showing the states where the second cylindrical lens 17 in the second embodiment satisfies the conditions (1) and (2), in which FIG. 9A shows the first state and FIG. 9B shows the second state. In FIGS. 9A and 9B, the reference numeral "15b" indicates the image point of the second cylindrical lens 17 and also the object point of the third cylindrical lens 18. Meanwhile, "15a" indicates the image point of the first cylindrical lens 16 and also the object point of the second cylindrical lens 17. The line image formation position 20p is the image point of the third cylindrical lens 18 with respect to the object point 15b of the third cylindrical lens 18.

When the second cylindrical lens 17 is moved so as to fulfill the conditions (1) and (2), since the sum of $a_1$ (the distance from the image point 15a of the first cylindrical lens 16 to the second cylindrical lens 17) and $b_1$ (the distance from the second cylindrical lens 17 to the object point 15b of the third cylindrical lens 18) in the first state is equal to the sum of $a_2$ and $b_2$ in the second state as mentioned before, the position of the point 15b (object point of the third cylindrical lens 18) does not change. Therefore, the line image formation position 20p does not move even if the magnification of the first optical system 215 is changed between two values by moving the second cylindrical lens 17.

Thus, by letting the holder 19 hold the first through third cylindrical lenses 16–18 so that the second cylindrical lens 17 will move between the two positions satisfying the conditions (1) and (2), the switching of the scan line interval (pitch) can be realized by the ON-OFF control of the motor 195 only, similarly to the first embodiment. Therefore, also in the second embodiment employing three lenses for the first optical system 215, the scan line interval in the auxiliary scanning direction can be switched between two values using the holder 19 (moving mechanism) having the same fairly simple composition as that of the first embodiment.

In the following, a concrete example of the scanning optical system according to the second embodiment will be explained in detail.

Example of Second Embodiment

In this example of the second embodiment, the scanning coefficient k is 200, and the focal length of the whole second optical system 225 is 200 mm, the auxiliary scanning magnification is −1.056×, and the scan width on the scan target surface S (the width of laser beam scan measured in the main scanning direction) is 300 mm.

The focal length of the collimator lens 10b of the light source unit 10 is 20 mm. The pitch (interval) of the light emitting points of the semiconductor laser array 10a is 14 μm.

The focal lengths of the first through third cylindrical lenses 16–18 are 50.008 mm, −17.139 mm and 35.242 mm, respectively.

The transverse magnification $Mp_1$ of the second cylindrical lens 17 in the auxiliary scanning direction in the first state is −1.22, and the transverse magnification $Mp_2$ of the second cylindrical lens 17 in the auxiliary scanning direction in the second state is −0.82. The following Table 5 shows concrete numerical configuration of the optical surfaces existing on the optical path from the first optical system 215 to the scan target surface S in this example.

TABLE 5

| SURFACE No. | Ry | Rz | SURFACE INTERVAL | n |
|---|---|---|---|---|
| First Cylindrical Lens | ∞ | 25.540 | 5.00 | 1.51072 |
|  | ∞ |  | D1 |  |
| Second Cylindrical Lens | ∞ | −18.000 | 3.00 | 1.51072 |
|  | ∞ | 18.000 | D2 |  |
| Third Cylindrical Lens | ∞ |  | 4.00 | 1.51072 |
|  | ∞ | −18.000 | 84.40 |  |
| Polygonal Mirror |  |  | 45.00 |  |
| 1 | −219.385 |  | 16.00 | 1.48617 |
| 2 | −66.973 |  | 82.04 |  |
| 3 | −400.000 | 35.627 | 7.00 | 1.48617 |
| 4 | −550.000 |  | 114.95 |  |

In Table 5, the meaning of each column is the same as that in the aforementioned Table 1. Each number in the column "SURFACE No." indicates the surface number of each lens surface of the second optical system 225, in which No.1 and No.2 denote front and rear surfaces of a first lens 26, and No.3 and No.4 denote front and rear surfaces of a second lens 27.

The first cylindrical lens 16 shown in Table 5 has a cylindrical front surface (convex) and a plane rear surface.

The second cylindrical lens 17 has a cylindrical front surface (concave) and a cylindrical rear surface (concave).

The third cylindrical lens 18 has a plane front surface and a cylindrical rear surface (convex).

The lens surfaces No.1 and No.2 of the second optical system 225 are both rotationally symmetrical aspherical surfaces. The coefficients of the equation (8) specifying the particular shapes of the lens surfaces No.1 and No.2 of this example will be shown in the following Table 6.

TABLE 6

|  | No. 1 | No. 2 |
|---|---|---|
| κ | 0.0 | 0.0 |
| $A_4$ | 2.39733E−07 | 3.89994E−07 |
| $A_6$ | 6.95131E−11 | 8.26608E−11 |
| $A_8$ | −1.34188E−14 | 2.39426E−14 |

The lens surface No.3 of the second lens 27 of the second optical system 225 is an anamorphic aspherical surface. The coefficients of the equations (9) and (10) specifying the particular shape of the lens surface No.3 of this example will be shown in the following Table 7.

TABLE 7

| $AM_1$ = | 0.00000E−00 | $AS_1$ = | −2.06154E−06 |
| $AM_2$ = | 0.00000E−00 | $AS_2$ = | −7.83204E−07 |
| $AM_3$ = | 0.00000E−00 | $AS_3$ = | 0.00000E−00 |
| $AM_4$ = | 1.38383E−07 | $AS_4$ = | 1.17505E−11 |
| $AM_5$ = | 0.00000E−00 | $AS_5$ = | 0.00000E−00 |
| $AM_6$ = | −6.49895E−12 | $AS_6$ = | 0.00000E−00 |
| $AM_7$ = | 0.00000E−00 | $AS_7$ = | 0.00000E−00 |
| $AM_8$ = | 1.28497E−16 | $AS_8$ = | 0.00000E−00 |

In the scanning optical system 2 of the example of the second embodiment having the above concrete numerical configuration, the change of state between the first and second states causes changes in the focal length of the whole first optical system 215, the auxiliary scanning magnification of the whole scanning optical system 2, and the beam interval (scan line interval), as shown in the following Table 8.

TABLE 8

| | D1 | D2 | FOCUS LENGTH (FIRST OPTICAL SYSTEM) | MAGNIFICATION (WHOLE SCANNING OPTICAL SYSTEM) | BEAM INTERVAL |
|---|---|---|---|---|---|
| FIRST STATE | 14.55 | 18.85 | 85.10 | 4.54× | 63.5 μm |
| SECOND STATE | 7.70 | 25.70 | 57.22 | 3.02× | 42.3 μm |

Figures 10A, 10B:
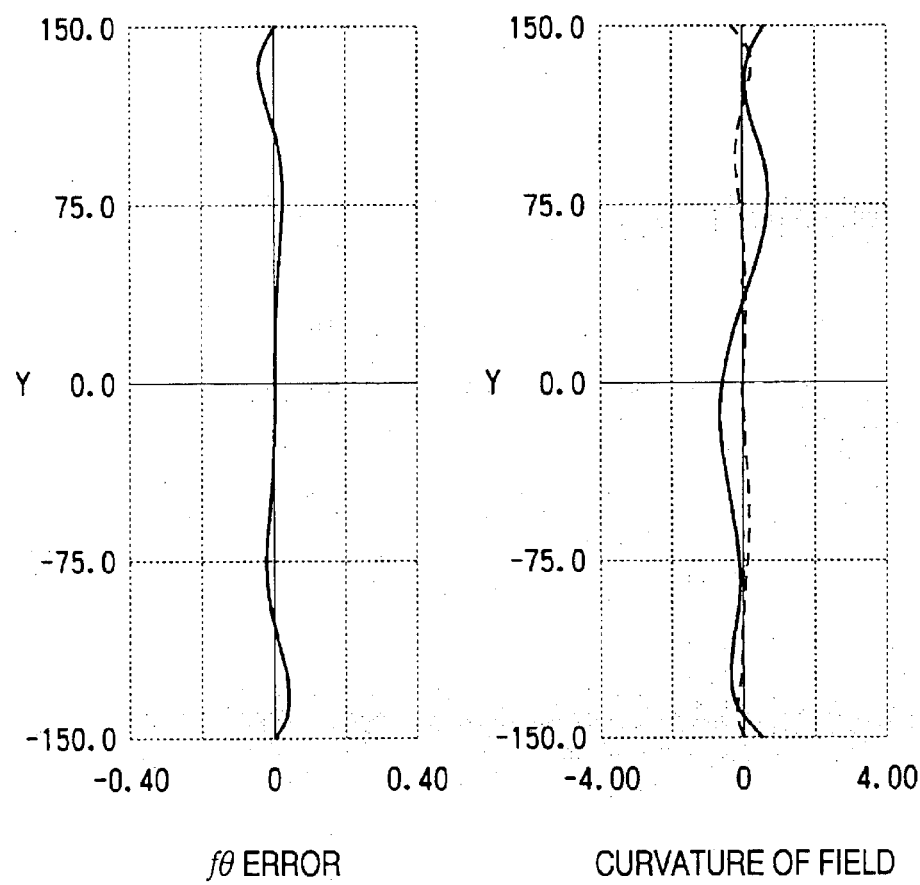
FIGS. 10A and 10B are graphs showing aberrations of the second optical system of the scanning optical system of the second embodiment.

In Table 8, the meaning of each column is the same as that in the aforementioned Table 4. FIGS. 10A and 10B are graphs showing aberrations of the second optical system 225 of the scanning optical system 1 of the example, in which FIG. 10A shows fθ error and FIG. 10B shows image surface curvature.

While the present invention has been described with reference to the particular illustrative embodiments, it is not to be restricted by those embodiments but only by the appended claims. For example, while the deflecting system was implemented by a polygon mirror in the above embodiments, other types of deflecting system such as a galvanometer mirror can also be used. The scanning optical system of the present invention can be applied to a variety of printing devices such as electrophotographic laser beam printers, digital photocopiers, laser fax machines and laser plotters. It should be understood that those skilled in the art can change or modify the embodiments without departing from the scope and spirit of the present invention.

The present disclosure relates to the subject matter contained in Japanese Patent Application No. P2002-376162, filed on Dec. 26, 2002, which is expressly incorporated herein by reference in its entirety.

What is claimed is:

1. A scanning optical system for dynamically deflecting a plurality of beams simultaneously and thereby scanning the beams in a main scanning direction on a scan target surface, comprising:

a light source having a plurality of light emitting points which emit the plurality of beams and a collimator lens which collimates the plurality of beams, the plurality of beams being emitted from said light source as a plurality of collimated beams collimated by the collimator lens;

a first optical system including a first fixed lens group placed on a light source side of said first optical system and a movable lens group having negative finite transverse magnification with respect to images formed by said first fixed lens group, said first optical system converging each of the plurality of beams emitted from said light source in an auxiliary scanning direction perpendicular to the main scanning direction;

a moving mechanism which holds said movable lens group to be movable along an optical axis of said collimator lens and selectively stops said movable lens group at a first position and a second position only, the first and second positions being determined so that transverse magnification $Mp_1$ of said movable lens group with respect to the images formed by said first fixed lens group when said movable lens group is placed at the first position and transverse magnification $Mp_2$ of said movable lens group with respect to the images formed by said first fixed lens group when said movable lens group is placed at the second position will satisfy $Mp_1 \times Mp_2 = 1 \ldots (1)$;

a deflecting system that dynamically deflects the plurality of beams simultaneously in the main scanning direction at a position in the vicinity of a line image formation position where a plurality of line images are formed by the convergence of the beams in the auxiliary scanning direction by said first optical system; and a second optical system which converges the dynamically deflected beams in the main scanning direction and in the auxiliary scanning direction to focus in the vicinity of said scan target surface and thereby forms a plurality of scan lines on said scan target surface.

2. The scanning optical system according to claim 1, wherein an interval P1 between the scan lines when said movable lens group is placed at the first position and an interval P2 between the scan lines when said movable lens group is placed at the second position satisfy:

$$Mp_1 = -(P1/P2)^{1/2} = 1/Mp_2 \qquad (2).$$

3. The scanning optical system according to claim 1, wherein said first optical system consists of:

said first fixed lens group having negative refractive power in the auxiliary scanning direction and thereby forming the images as virtual images; and said movable lens group having positive refractive power in the auxiliary scanning direction.

4. The scanning optical system according to claim 2, wherein the transverse magnification $Mp_1$ of said movable lens group in the auxiliary scanning direction when said movable lens group is placed at the first position is approximately −1.41, and the transverse magnification $Mp_2$ of said movable lens group in the auxiliary scanning direction when said movable lens group is placed at the second position is approximately −0.71.

5. The scanning optical system according to claim 1, wherein said first optical system includes:

said first fixed lens group having positive refractive power in the auxiliary scanning direction and thereby forming the images as real images;

said movable lens group having negative refractive power in the auxiliary scanning direction and thereby forming virtual images of the real images; and a second fixed lens group having positive refractive power in the auxiliary scanning direction and thereby forming real images of the virtual images.

6. The scanning optical system according to claim 2, wherein the transverse magnification $Mp_1$ of said movable lens group in the auxiliary scanning direction when said movable lens group is placed at the first position is approximately −1.22, and the transverse magnification $Mp_2$ of said movable lens group in the auxiliary scanning direction when said movable lens group is placed at the second position is approximately −0.82.

7. The scanning optical system according to claim 1, wherein said moving mechanism includes:

a first fixed mount on which said first fixed lens group is mounted;

a second fixed mount placed at a preset distance from said first fixed mount;

a movable mount placed between said first and second fixed mounts on which said movable lens group is mounted;

a guide held by said first and second fixed mounts and inserted into a through hole of said movable mount;

a screw rotatably held by said first and second fixed mounts and inserted into a through hole of said movable mount having an engaging mechanism for smoothly engaging with said screw; and a rotating mechanism for rotating the screw, wherein said movable lens group is stopped at the first position when said movable mount makes contact with said first fixed mount, and said movable lens group is stopped at the second position when said movable mount makes contact with said second fixed mount.

* * * * *